March 14, 1939.   G. B. RAYBURN   2,150,846
FISH LURE
Filed May 26, 1938   2 Sheets-Sheet 1

Inventor
G. B. Rayburn

By Clarence A. O'Brien and
Hyman Berman
Attorney

March 14, 1939.  G. B. RAYBURN  2,150,846
FISH LURE
Filed May 26, 1938  2 Sheets-sheet 2
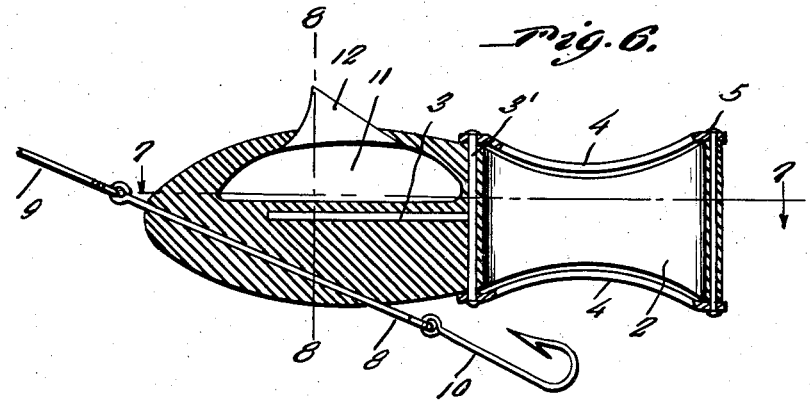
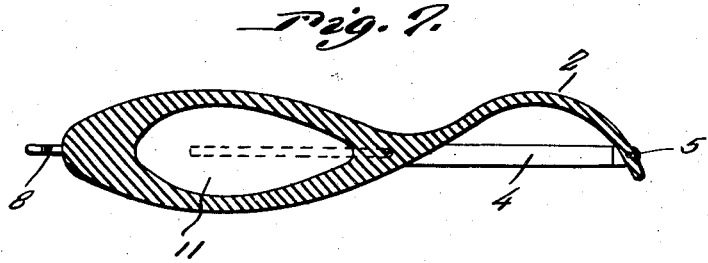
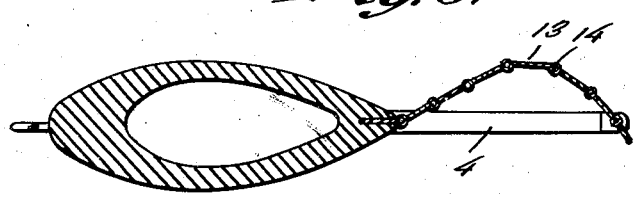
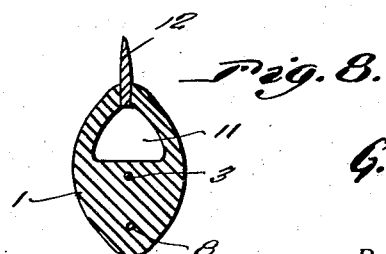
Inventor
G. B. Rayburn
By Clarence A. O'Brien and
Hyman Berman
Attorney Patented Mar. 14, 1939

2,150,846

UNITED STATES PATENT OFFICE 2,150,846

FISH LURE

George B. Rayburn, Los Angeles, Calif.

Application May 26, 1938, Serial No. 210,232

2 Claims. (Cl. 43—46)

This invention relates to a fish lure, the general object of the invention being to provide a lure having a flexible tail portion which is so constructed and arranged that the water will cause said tail portion to move with a wave motion back and forth as the lure is drawn through the water, thus giving the device a life-like appearance which will attract large types of fish which prey on smaller fish and other creatures living in the water.

Another object of the invention is to provide a chamber in the body of the lure which will form an air chamber to keep the lure in an upright position or which can be filled with cork or the like for the same purpose.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 6 is a longitudinal sectional view through the lure.

Figure 7 is a section on the line 7—7 of Figure 6.

Figure 8 is a section on the line 8—8 of Figure 6.

Figure 9 is a view similar to Figure 7 but showing a modification.

Figure 1:
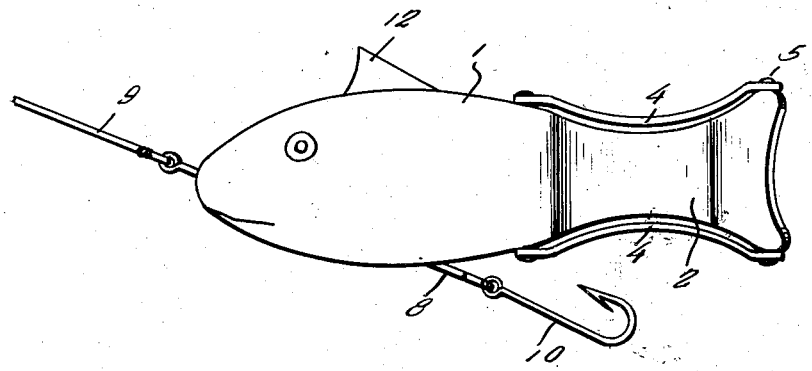
Figure 1 is an elevation of the improved device.
Figure 2:
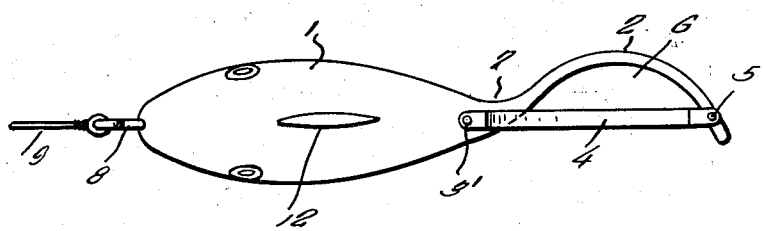
Figure 2 is a top plan view thereof.
Figure 3:
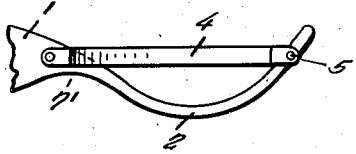
Figure 3 is a top plan view of the tail portion of the lure showing the tail part in a different position from that shown in Figure 2.
Figure 4:
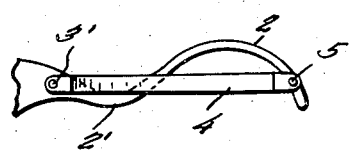
Figure 4 is a view similar to Figure 3 and showing how the tail part is moved by the water as the lure is drawn through the water.
Figure 5:
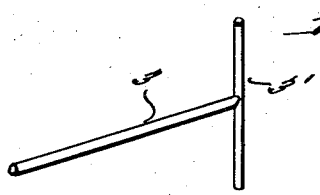
Figure 5 is a view of the T-shaped rod which supports the tail supporting bar.

In these drawings, the numeral 1 indicates the body of the lure which is formed of any suitable material and while the drawings show it in the form of a fish it will of course be understood that it can be made in the form of other creatures inhabiting water. A flat tail part 2 is suitably connected with the rear end of the body part and this part 2 is formed of flexible material and if the body of the lure is formed of rubber this tail part can be formed from a continuation of the body but must be sufficiently flexible to be moved by the water as to be hereinafter described. A T-shaped rod 3 has its stem part embedded in the material of the body, as shown in Figure 6 with the head of the T vertically arranged and passing through the upper and lower parts of the body adjacent the rear end thereof. Bars 4 are connected with the ends of this head part 3' of the T-shaped rod, the upper bar being preferably bowed downwardly and the lower bar upwardly. A rod 5 is carried by the rear ends of these bars 4 and the rear part of the tail portion 2 has this rod 5 passing through it. This part 5 is so placed in the tail portion that when it is engaged with the bars 4 the tail portion will form a loop as shown so as to provide a space 6 in the bow of the loop and a second space 7 between the tail part and one side of the body. Thus when the lure is drawn through the water the pressure of the water in the space 7 acting against the curved part of the tail portion 2 will tend to force the inner part of the tail portion between the bars 4, as shown at 2' in Figure 4 and this action continues until the tail part reverses its position as shown in Figure 3. Then the water between the tail part and the opposite side of the body in the space 7' will act on the tail part to return it to the position shown in Figure 2. Thus the water imparts a wave motion to the tail part as shown in Figures 2, 3 and 4 and back and forth through the bars 4. This will give the lure a life-like motion so that large fish will be attracted to it and thus when they strike they will be engaged by hooks, any number of which can be used with the device. However, the drawings show a rod 8 passing downwardly and rearwardly through the body from the front end to a point at the lower part thereof adjacent the tail. An eye is formed on each end of the rod, the front end receiving the line 9 and the rear end the eye of the fish hook 10. Also a chamber 11 is formed in the upper portion of the body and the fin simulating part 12 is carried by the top of the body and the edges of the body can be vulcanized to the fin to make the chamber air and watertight. If desired this chamber can be filled with cork or other buoyant material. This chamber either when used as an air chamber or filled with buoyant material will act to keep the lure in upright position. If desired the end of the tail part 2 can be extended well beyond the pin or bar 5 so as to give larger tail surface at the extreme end of the lure and this will produce a wider swing of the tail.

Figure 9 shows the tail part as formed of metal plates or the like, each plate 13 being hingedly connected to another plate as shown at 14. This provides a flexible tail formed of metal or the like but which will have the same action as the tail part before described. If desired the rods 4 can be pivoted to the head part 3'.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A lure of the class described comprising a body part, a vertically arranged bar passing through the rear portion of the body part, upper and lower bars having their front ends engaging the ends of the first-mentioned bar, a rod carried by the rear end of the upper and lower bars, and a flexible tail portion connected with the rear end of the body and passing between the upper and lower bars and having a portion held by the rod, said parts being constructed and arranged to hold the tail part in a bow which is vertically arranged and said bow forming a recess between itself and a side of the body whereby the water in the recess acting upon the bow will force the same in a water-like motion to the opposite side of the body and reverse the bow, so that the water at the opposite side of the body will force the bow to the first side.

2. A lure comprising a body part, a trailing frame extending from the rear end of said body part, and a flexible tail portion in said frame connected at its opposite ends to the rear end of the body part and to the rear end of the frame, respectively, said tail portion being longer than the frame whereby it is normally bowed to one side thereof and flexible from side to side of the frame under travel through the water.

GEORGE B. RAYBURN.